Patented May 13, 1930

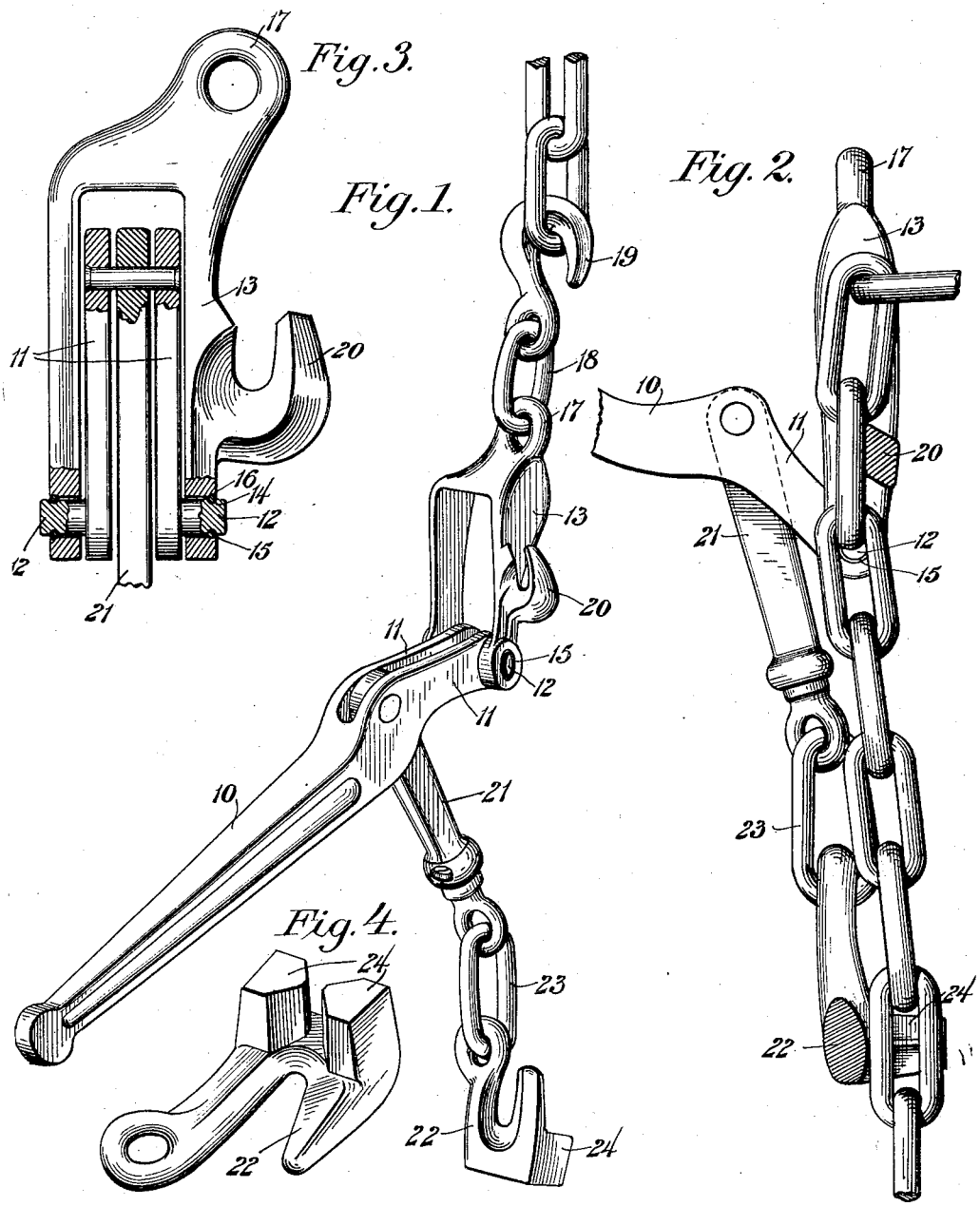

1,758,039

UNITED STATES PATENT OFFICE

LEO HAUBERT, OF TULSA, OKLAHOMA, ASSIGNOR OF ONE-EIGHTH TO LYMAN LEROY ROLLER, OF MUSKOGEE, OKLAHOMA

LOAD BINDER

Application filed April 14, 1927. Serial No. 183,863.

This invention relates to pulling implements of the type adapted for use as load binders and aims, among other objects, to provide an improved binder having provision for taking several bites on a chain to tighten or release it and to hold the chain while new bites are being taken.

In the accompanying drawing wherein I have shown one embodiment of the invention, Fig. 1 is a perspective view of a load binder embodying my invention;

Fig. 2 is a fragmentary side elevation showing parts in section, the binder being applied to a chain;

Fig. 3 is an elevation of the improved clevis shown in Fig. 1 and also showing other parts partially broken and in section; and Fig. 4 is a perspective view of the tightening hook shown in Fig. 1.

Referring particularly to the drawing (see Fig. 1), I have there shown a lever 10 having a bifurcated end portion and presenting spaced arms 11, each having a trunnion 12 to which my clevis 13 is pivotally connected. To prevent the arms of the clevis from spreading apart or the arms 11 of the bifurcated end portion of the handle from being squeezed together when a load is applied, I provide annular grooves 14 in the trunnions adjacent to the outer ends thereof to receive rings 15 and the clevis around the opening has a counterbore 16 to engage over the rings.

At the outer end of the clevis I have shown an offset eye 17 to receive a chain link 18 carrying a chain hook 19. At one side of the clevis I provide an integral hook 20 projecting upwardly and forwardly at an angle to the plane of the clevis. This hook is arranged to receive a link of the slack end of a chain after it is tightened.

Near the bottom of the bifurcation in the lever I have shown an arm 21 pivoted on a rivet and adapted to swing freely in the bifurcation. At the free end of this arm I have shown a swivel eye to which is connected a second hook 22 by means of a link 23. When the hook is used on a tight chain, it has to be twisted at an angle and this entails considerable lost motion. To eliminate lost motion incident to using the hook 22 on a tight chain, particularly when my device is used as a hoist, I provide lateral chain engaging lugs 24 on one side of the hook 22 so arranged that when the hook is swiveled around, they may be pushed laterally into engagement with one of the links with practically no lost motion. When the lateral lugs are used, a link in the slack part of the chain may be inserted in the hook 22 to provide a double grip and avoid any possibility of the chain slipping out. I find the lateral lugs particularly useful when my implement is used for hoisting apparatus; that is to say, for lifting heavy loads vertically. Moreover, the lugs are spaced further apart than the thickness of ordinary chain links so that they will engage and hold chains of different sizes, thus avoiding the necessity for substituting different sized hooks for the hook 22. The hook 22 can be used in the ordinary way without the lugs by turning it on the swivel.

In practical application of my invention for tightening chains on logs, for example, the hook 19 is engaged in the link of one free end of the chain while the other end of the chain is pulled as tightly as possible around the log and the link thereof is engaged edgewise between the V-shaped faces of the lugs 24, another link thereof being dropped into the hook 22. With the lever 10 in the position indicated in Fig. 1, the operator moves it upwardly until it is in the position indicated in Fig. 2, thereby taking up some of the slack in the chain. Then, to permit the hook 22 to take another bite on the chain, the operator engages one of the links of the slack end of the chain edgewise in the bight of the hook 20. Upon swinging the lever 10 back to the position shown in Fig. 1, the hook 22 and the lugs 24 may be disengaged and another bite taken on the chain for the second operation, and so on. When it is desired to release the chain from the load, the hook 22 and the lugs 24 are again engaged as in the case of tightening the chain on the load to take up the chain slack between the hook 22 and the side hook 20 and the link in the hook 20 is released so that another link may be engaged therewith and another bite taken on the chain to back it off. In other words, the releasing operation is exactly opposite from the tightening operation; that is to say, a series of bites are taken and the chain is released by degrees.

From the foregoing description it will be observed that the hook 19 and the hook 20 are practically in alinement with the chain to be held thereby and inasmuch as the chain is arranged at one side of the lever, it does not interfere with the free operation thereof. Moreover, the tightening hook 22 can be swiveled on the arm 21 to come in line with the hooks 19 and 20. Further, when my implement is folded, ready for transportation, the clevis 13 may be swung down from the heel portion of the handle and the arm 21 may be swung between the arms 11 of the bifurcated end so that the implement will occupy a minimum shipping space.

Obviously the present invention is not restricted to the particular embodiment thereof herein shown and described. Moreover, it is not indispensable that all the features of the invention be used conjointly, since they may be employed advantageously in various combinations and subcombinations.

What I claim is:

1. A load binder or pulling implement comprising, in combination, a lever having a bifurcated end; trunnions on the ends of the arms provided thereby; a clevis pivotally mounted on said trunnions; a chain-holding hook on one side of said clevis and a hook on the end thereof; an arm pivotally mounted in the bifurcation spaced from said trunnions; and a chain hook swivelly mounted on the end of said arm.

2. A load binder or pulling implement comprising, in combination, a lever; a clevis pivotally mounted on the end of said lever; a chain-holding hook on the side of said clevis and a hook secured to the free end thereof; a hook pivotally secured to the lever in spaced relation to the pivotal point of said clevis; and chain link engaging means on the side of said hook.

3. A load binder or pulling implement comprising, in combination, a lever having a bifurcated end; trunnions on the ends of the arms provided thereby; a clevis pivotally mounted on said trunnions; said trunnions having annular grooves therein and split rings seated in said grooves to prevent the clevis from spreading apart under load; a chain-holding hook on one side of said clevis and a hook on the end thereof; an arm pivotally mounted in the bifurcation spaced from said trunnions; and a chain hook swivelly mounted on the end of said arm.

4. A load binder or pulling implement comprising, in combination, a lever having a bifurcated end; trunnions on the ends of the arms provided thereby; a clevis pivotally mounted on said trunnions; said trunnions having annular grooves near the ends and the the clevis having a counterbore, and rings seated in said grooves and counterbores to prevent the clevis arms from spreading apart; a chain-holding hook on one side of said clevis and a hook on the end thereof; an arm pivotally mounted in the bifurcation spaced from said trunnions; and a chain hook swivelly mounted on the end of said arm.

5. A load binder or pulling implement comprising, in combination, a lever; a clevis having arms pivoted on the end of the lever; a hook secured to the free end of the clevis and a hook integral with one arm thereof; and another hook pivotally supported on said lever arranged to tighten a chain.

6. A load binder or pulling implement comprising, in combination, a lever; a chain hook operatively secured to one end of the lever; another chain hook pivotally secured to the lever to tighten a chain; and a chain hook also operatively connected to the end of said lever and arranged to hold the slack portion of the chain when it is tightened whereby to permit the tightening hook to take another hold.

7. A load binder or pulling implement comprising, in combination, a lever; a chain hook operatively secured to one end of the lever; a second chain hook pivotally secured to the lever to tighten the chain upon movement of the lever toward the first named hook; and means carried by one side of the tightening hook to engage a link of the chain.

8. A load binder or pulling implement comprising, in combination, a lever; a chain hook operatively secured to one end of the lever; an arm pivoted to the lever; a hook swivelly secured to the free end of the arm; and spaced link-receiving lugs projecting from one side of the hook to receive links of different sizes.

In testimony, that I claim the foregoing as my own, I have hereto affixed my signature.

LEO HAUBERT.